United States Patent [19]

Doerr et al.

[11] 4,285,695

[45] Aug. 25, 1981

[54] PROCESS FOR INHIBITING CRUST FORMATION IN REDUCED DYE BATHS

[75] Inventors: Richard L. Doerr, Orange; Michael Scardera, Hamden, both of Conn.

[73] Assignee: Olin Corporation, New Haven, Conn.

[21] Appl. No.: 89,684

[22] Filed: Oct. 30, 1979

Related U.S. Application Data

[63] Continuation-in-part of Ser. No. 860,539, Dec. 14, 1977, abandoned.

[51] Int. Cl.$^3$ .................. C09B 67/28; C09B 7/00
[52] U.S. Cl. .......................... 8/650; 8/452; 8/652; 8/653; 8/908; 8/909; 8/912
[58] Field of Search .............. 8/38, 34, 37, 650, 653, 8/908, 909, 912

[56] References Cited

U.S. PATENT DOCUMENTS

| | | | |
|---|---|---|---|
| 1,794,805 | 3/1931 | Strosacker et al. | 8/38 |
| 1,881,745 | 10/1932 | Lindner | 8/38 |
| 1,915,326 | 6/1933 | Masterson | 8/38 |
| 2,233,101 | 2/1941 | Kern | 8/38 |
| 3,054,658 | 9/1962 | Franklin et al. | 423/275 |
| 3,353,909 | 11/1967 | Janson et al. | 252/188 |
| 3,468,623 | 9/1969 | van Damme-van Weele | 252/188 |
| 4,166,717 | 9/1979 | Fond et al. | 8/587 |

OTHER PUBLICATIONS

Fox, M. R., "Vat Dyestuffs and Vat Dyeing", (Wiley, New York), 1948, pp. 84–88.

*Primary Examiner*—A. Lionel Clingman
*Attorney, Agent, or Firm*—William D. Sabo

[57] ABSTRACT

An improved sodium hydrosulfite dye reducing composition is described for reducing vat or sulfur dye in aqueous dye bath solutions, comprised of sodium dithionite, at least 1 percent sodium sulfite by weight of sodium dithionite, and stabilized by alkali metal hydroxide, the improvement characterized by including in this composition an effective surface crust inhibiting amount of an anionic surfactant selected from the group consisting of alkyl sulfates, alkyl aryl phosphate esters, N-acyl-N-alkyl taurates, α-olefin sulfonates, alkyl aryl disulfonates, dodecylated oxydibenzene sulfonates, and mixtures thereof.

14 Claims, No Drawings

PROCESS FOR INHIBITING CRUST FORMATION IN REDUCED DYE BATHS

This application is a continuation-in-part of application Ser. No. 860,539, filed Dec. 14, 1977, now abandoned.

This invention relates to the prevention of crust formation in solutions used in the vat dyeing of textiles. More particularly, this invention relates to the prevention of crust formation in aqueous solutions of sodium hydrosulfite used in vat dyeing of textile.

Conventional practice in the art of textile dyeing with indigo dye is to prepare initially an aqueous solution of the dye in reduced form. Reducing solubilizes the indigo dye and facilitates applying the dye to the cotton or cellulosic textile. After application to the textile, the reduced dye is oxidized to develop dye color and improve dye fastness on the textile fabric.

Indigo dye is commonly reduced in aqueous solution with a reducing agent such as an aqueous solution of sodium hydrosulfite. However, a problem encountered in practice is that an undesirable crust often develops on the surface of the reduced dye solution upon standing. While the exact cause of this crust formation is not fully understood, it has been determined that the crust consists primarily of impurities and particles of indigo dye. In addition to presenting a clean-up problem and posing a threat of fouling pumping equipment and transfer lines, the loss of the expensive indigo dye with the crust waste is an economic detriment.

Sodium hydrosulfite, known as sodium dithionite or hydro dye reducing agent, is produced commercially by various processes; such as formate processes exemplified by U.S. Pat. No. 3,411,875, issued to Yoshio Yoshikawa et al on Nov. 19, 1968 and U.S. Pat. No. 3,576,598, issued to Jack Plentovich et al on Apr. 27, 1971, zinc processes exemplified by U.S. Pat. No. 2,226,576, issued to Ralph S. Park et al on Dec. 31, 1940, and amalgam processes exemplified by U.S. Pat. No. 2,938,771; U.S. Pat. No. 1,477,130 and U.S. Pat. No. 2,084,651, issued to Werner Mecklenburg et al on June 22, 1937. U.S. Pat. No. 4,100,098, issued to Phillip R. Magan on July 11, 1978, discloses the composition of a sodium hydrosulfite solution prepared by the reaction of sulfur dioxide gas with sodium amalgam in a rotary reactor as comprising an aqueous solution containing about 13.5 percent sodium hydrosulfite and about 2.5 percent sodium sulfite. The teachings of this patent are incorporated by reference in its entirety. The solution produced by the amalgam process contains a concentrated mixture of sodium dithionite and sodium sulfite. U.S. Pat. No. 4,100,098, supra, teaches that these solutions are unstable, the instability being produced by increases in concentration, in temperature, and in acidity. The same patent teaches that KOH is added to the sodium dithionite solution as a stabilizer after the product has been removed from the reactor. The process comprises adding potassium hydroxide in an amount which is sufficient to provide a residual of potassium hydroxide of from about 1 to about 12, preferably from about 3 to about 8, grams per liter of sodium dithionite solution to prepare a stabilized homogeneous solution containing mixtures of sodium dithionite and sodium sulfite having concentrations of greater than 13 percent, preferably from about 13 to about 15 by weight of sodium dithionite and at least 1 percent of sodium sulfite by weight of sodium dithionite.

The various processes produce sodium hydrosulfite containing significant quantities and types of co-product salts, such as sodium sulfite and sodium thiosulfate, which are known to be capable of decreasing the stability of the sodium hydrosulfite even with sodium hydroxide and potassium hydroxide stabilization. The concentration of the co-products, sodium sulfite and sodium thiosulfate, particularly in sodium dithionite solutions prepared by the reaction of sodium amalgam with sulfur dioxide in a rotary reactor has now been found also to increase surface crust formation during dye bath utilization.

Several U.S. patents disclose chemical agents for addition to sodium hydrosulfite solutions.

U.S. Pat. No. 2,233,101, issued to Jean G. Kern on Feb. 25, 1941, discloses a vat dye powder composition as containing a soluble organic ester of an aliphatic polycarboxylic acid containing not more than 8 aliphatic carbon atoms joined carbon-to-carbon. Polycarboxylic acid derived esters are disclosed which contain at least one solubilizing radical which is a sulfonate, sulfate, or phosphate free from aliphatic radicals containing a total of more than 12 aliphatic carbon atoms per aliphatic radical and from aliphatic radicals containing more than 8 aliphatic carbon atoms in a straight carbon chain.

U.S. Pat. No. 3,645,665, issued to James N. Etters on Feb. 29, 1972, employs an aldehyde derived bisulfite stabilizer in a process for dyeing cellulosic textiles.

U.S. Pat. No. 4,166,717, issued to Andrew Fono et al on Sept. 4, 1979, discloses a process for dyeing cellulosic textiles with indigo dye which comprises reducing indigo dye to its soluble leuco form, incorporating an aldehyde addition product to the reduced indigo dye solution, immersing a cellulosic textile, and exposing the textile to air to oxidize the dye to its insoluble color. This patent teaches that the amount of sodium hydroxide is critical in the process. No teaching of applicability of this process to KOH stabilized sodium dithionite solutions is presented.

None of the above-mentioned patents recognize the problem of surface crust formation in aqueous sodium dithionite solutions containing appreciable co-product salts such as sodium sulfite and sodium thiosulfate.

OBJECTS

It is a primary object of the present invention to provide a composition and a process for inhibiting surface crust formation in sodium hydrosulfite bleaching solutions.

This and other objects of the invention will become apparent to those skilled in the art upon reading the specification and claims.

BRIEF DESCRIPTION OF THE INVENTION

These and other objects of the invention are achieved in a sodium hydrosulfite composition for reducing vat or sulfur dye in aqueous dye bath solutions, comprised of greater than about 10 percent by weight of sodium dithionite, at least 1 percent sodium sulfite by weight of sodium dithionite, and stabilized by alkali metal hydroxides such as KOH, NaOH and mixtures thereof, the improvement characterized by including in said composition an effective surface crust inhibiting amount of an anionic surfactant selected from the group consisting of alkyl sulfates, alkyl aryl phosphate esters, N-acyl-N-alkyl taurates, α-olefin sulfonates, alkyl aryl disulfonates, dodecylated oxydibenze sulfonates, and mixtures thereof.

DETAILED DESCRIPTION OF THE INVENTION

In the process of this invention, effective surface crust inhibiting amounts of an anionic surfactant are included in a sodium hydrosulfite composition utilized for reducing vat or sulfur dye in aqueous dye bath solutions.

According to the present invention, crust formation in aqueous indigo dye solutions reduced with sodium hydrosulfite can be prevented through the addition of effective surface crust inhibiting amounts of select anionic surfactants to the dye solutions. In specific, anionic surfactants have been found to be effective agents inhibiting the surface crusting problem.

The exact nature of the cause of the crust formation or its compositions is not fully understood. Without being bound by theory, it is believed that increased co-product salt concentration in the reduced dye bath causes impurities present in the dye solution to rise to the surface of the solution and attract dye molecules which gradually accumulate into a surface skin or crust. Anionic surfactants are compatible with the high salt concentration solutions and the addition of anionic surfactants to the sodium dithionite solutions effectively avoids this crusting process. Theoretically, the surfactant prevents insoluble impurities from rising to the surface and thus inhibiting the influence of these impurities in aggravating crust formation by serving as sites for dye aggregation.

Suitable surface crust inhibiting anionic surfactants include an anionic surfactant selected from the group consisting of alkyl sulfates, alkyl aryl phosphate esters, N-acyl-N-alkyl taurates, α-olefin sulfonates, alkyl aryl disulfonates, dodecylated oxydibenze sulfonates, and mixtures thereof.

Typical surface crust inhibiting anionic surfactants include:

(1) alkyl sulfates of the form $R_aSO_4M_b$, where $R_a$ is an alkyl alcohol of the form $CH_3(CH_2)_nCH_2OH$, where n is an integer in the range from 7 to 16 and where $M_b$ is a moiety selected from the group consisting of ammonium, calcium, magnesium, sodium, potassium, cations, diethanolamine, triethanolamine, and mixtures thereof. For example, suitable alkyl alcohols include n-$C_{11}H_{23}CH_2OH$ (lauryl alcohol, n-Dodecyl alcohol); $CH_3(CH_2)_{14}C_2OH$ (n-Hexsdecyl, cetyl alcohol); $CH_3(CH_2)_{16}CH_2OH$ (n-Octadecyl alcohol), oleyl, tallow, octyl, myristyl, 2-ethylhexyl and mixtures thereof.

Suitable alkyl sulfates include sodium lauryl sulfate, potassium lauryl sulfate, sodium cetyl sulfate, sodium n-octadecyl sulfate, potassium n-octadecyl sulfate or mixtures thereof. Preferred alkyl sulfates include sodium lauryl sulfate such as the material obtained commercially under the trade name "Dupanol C" from duPont;

(2) alkyl aryl phosphate esters of the form $R_cR_dSO_3H$, where $R_c$ is an aromatic nucleus selected from the group consisting of benzene, toluene, xylenes, ethyl, benzene, mesitylene, cymene, etc.; phenol; cresols, xylenols, and lower alkylated phenols; phenol ethers, anisole, phenetole, etc.; diaryl ethers, diphenyl ether, etc.; naphthalene; naphthols; naphthol ethers; diphenyl; phenyl phenols; di- and triphenyl methanes; benzoins and desoxybenzoins; rosin and modified rosins; or mixtures thereof, $R_d$ is an alkyl moiety selected from the group consisting of methyl and ethyl; propyl; butyl; amyl; hexyl; heptyl; straight-chain octyl; octyl, 2-ethyl hexyl; octyl, diisooctyl; nonyls, decyls, keryls; straight-chain alkyl $C_{9-18}$; straight-chain hydroxylated or unsaturated alkyl, oleyl, ricinoleyl (these may be attached to one or more aromatic nuclei); mixed alkyl from cracked paraffin wax olefins; mixed alkyl from polymers of $C_2$-$C_7$ monoolefins; mixed alkyl from naphthenes; terpenoid, from terpene olefins or alcohols; oleic acid derivative condensates, condensed through the double bond of the oleic chain; acyl group groups, i.e., alkyl aromatic ketones usually made by Friedel-Crafts acylation reaction; branched alkyl group derived from a ketone or aldehyde; olefins from miscellaneous synthetic processes; steroid and complex alkyl-aromatic and mixtures thereof.

Particular alkyl aryl phosphate esters include products which are mixtures of mono- and diesters of orthophosphoric acid prepared from nonionic surfactant of the ethylene oxide adduct type, monoesters of mixtures, the monoesters such as

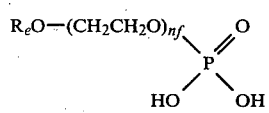

and diesters such as

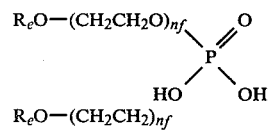

where $R_e$ is an alkyl or alkyl phenyl group having in the range from about 8 to about 20 carbon atoms and $n_f$ is the average number of moles of ethylene oxide that have reacted with 1 mole of $R_eOH$ alcohol (the hydrophobe). Any one of these free acids can be easily converted to a salt (alkali metal, ammonium, amine, etc.) by mixing it with a base.

Other suitable alkyl phosphates include alkyl phosphates of the form $R_fPO_4X_2$, $(R_f)_2PO_4X$, $(R_f)_5(P_3O_{10})_2X_5$, where $R_f$ is an alkyl group selected from the group consisting of 2-ethyl hexyl, octyl, decyl, dodecyl, octadecyl, 9-octadecenyl, hexyl; ethoxylated 2-ethyl hexanol; ethoxylated isooctyl alcohol; ethoxylated dodecyl alcohol; ethoxylated tridecyl alcohol; ethoxylated phenol; ethoxylated nonyl phenol; ethoxylated octyl phenol; ethoxylated pinonyl phenol; ethoxylated dodecyl phenol; and mixtures thereof and where X is a moiety selected from a group consisting of H, Na, K, morpholine, triethanolamine, Ba, Mg, and mixtures thereof.

Also, particularly suitable is the sodium salt of dodecylated oxydibenzene sulfonate of the formula

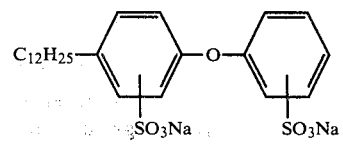

produced under the trade name "Dowfax 2A1" from Dow Chemical Company;

(3) N-acyl-N-alkyl taurates of the form such as $R_hR_iNCH_2CH_2SO_3Na$, where $R_h$ is a moiety selected from the group consisting of oleoyl, coco acyl, palmitoyl, tall oil, tallow, and mixtures thereof and where $R_i$ is a moiety selected from the group consisting of methyl, cyclohexyl and mixtures thereof. Suitable N-acyl-N-alkyl taurates include sodium-N-methyl-N-oleyl taurate or oleoyl methyl tauride, sodium salt; sodium-N-cyclohexyl-N-palmitoyl taurate; sodium-N-coconut acid-N-methyl taurate; sodium N-methyl-N-tall oil acid taurate;

(4) α-olefin sulfonates of the form $R_jSO_3C$, where $R_j$ is an alkene or substituted alkene group of the form $C_nH_{2n}$ where n is an integer in the range from 10 to 19 and where C is hydrogen or sodium. Suitable α-olefin sulfonates include sodium α-olefin sulfonates such as sodium decyl sulfonate.

Although the present invention is applicable with reduced solutions of any of the vat or sulfur dyes, generally, only indigo dye is applied to a textile in reduced form. Other dyes usually are subjected to reduction after the dye has been applied to the fabric and the problem of crust formation hence is not encountered. Typical commercially available indigo dyes, to which the invention is primarily applicable, are represented by Vat Blue 1 dyes (C.I. 73000). The color code given in parenthesis indicates a color standard as set forth in "Colour Index," Second Edition, supplement 1963, published by The Society of Dyer and Colourists, Yorkshire, England.

The anionic surfactant may be used in any amount effective to inhibit surface crust formation on the reduced dye solution. In the interest of economy, of course, it is preferred to employ as low as a concentration of surfactant as possible, while still ensuring consistently satisfactory results. The minimum effective amount of anionic surfactant varies with the concentration of salts and impurities in the sodium hydrosulfite reduced dye solution. In practice, it is generally common to utilize reduced indigo dye baths including about 40 to about 60 percent, by volume, based on total volume of the dye bath solution, of sodium hydrosulfite reducing solutions containing greater than about 10 and preferably greater than about 13 percent by weight of sodium dithionite, at least 1 percent of sodium sulfite by weight of sodium dithionite, and in the range from about 1 to about 12 grams KOH per liter. The preferred concentration range of surfactant has been found to be from about 0.002 to about 4.0 percent in the aqueous hydrosulfite reducing composition to effect a final concentration in the reduced dye bath solution from about 0.001 to about 2.0 percent, based on grams of surfactant per 100 ml of reduced dye solution; about 0.001 to about 0.2 percent being particularly preferred; and the most preferred range being about 0.025 to about 0.10 percent.

The effective amount of anionic surfactant may be added individually to the indigo dye bath as it is being prepared, or, preferably, the surfactant is pre-mixed in an effective proportion with the sodium hydrosulfite reducing solution prior to dye bath preparation and it then is added as a unitary sodium hydrosulfite composition.

The temperature of the process of this invention for preparing reduced indigo dye baths is in the range from about 10° to about 30° C. and preferably from about 15° to about 20° C.

The pressure of the process of this invention for preparing reduced indigo dye baths may be sub- or superatmospheric.

The following examples serve to illustrate the practice and advantages of the invention. All percentages are by weight unless otherwise specified.

REDUCED DYE BATCH COMPOSITION FORMULATION

Comparative Examples A–C

Example I

Reduced indigo dye bath solutions were prepared by dissolving sodium hydrosulfite ($Na_2S_2O_4$), sodium sulfite ($Na_2SO_3$) and sodium thiosulfate ($Na_2S_2O_3$) in 50% potassium hydroxide (KOH) and distilled water. According to the teachings of U.S. Pat. No. 4,100,098, supra, Indigo dye dispersion, Indigo Power X-DISP from Buffalo Color Corporation, was then added, followed by addition of a small amount of surfactant. Four such formulations were prepared—one control and one each of the remaining three employing different surfactant agents. The solutions, prepared in 125 ml Erlenmeyer flasks fitted with rubber stoppers, were vigorously agitated until all of the indigo dye was reduced to its leuco state as determined by action of the sodium hydrosulfite and no further surface oxidation was observed. The flasks were then allowed to stand without agitation and were observed for surface crust formation or any separation of solids or oils on the surface of the solution.

Table A below outlines the four test dye bath formulations. Comparative Example A was a control example to illustrate results obtained when no surfactant was employed. Comparative Examples B and C include portions of nonionic surfactant in the solutions; and Example I illustrates the present invention using sodium salt of dodecylated oxydibenzene sulfonate—an alkyl aryl sulfonate. The solutions of Comparative Examples A, B, and C all displayed immediate surface crust formation and significant separation of solids and oils at the surface of the indigo dye bath solutions. Example I alone showed no surface crust formation or separations even after standing overnight.

TABLE A

| Component | Dye Bath | | | |
| --- | --- | --- | --- | --- |
| | Comparative Example A | Comparative Example B | Comparative Example C | Example I |
| Indigo Dye Dispersion | 45 g | 45 g | 45 g | 45 g |
| 50% KOH | 17.6 cc | 17.6 cc | 17.6 cc | 17.6 cc |
| 80% $Na_2S_2O_4$ | 10 g | 10 g | 10 g | 10 g |
| $Na_2SO_3$ | 4.2 g | 4.2 g | 4.2 g | 4.2 g |
| $Na_2S_2O_3$ | 0.52 g | 0.52 g | 0.52 g | 0.52 g |
| Total Volume ($H_2O$) | 100 cc | 100 cc | 100 cc | 100 cc |
| Surfactant Type | | | | |
| Nonionic ① | — | 0.2 g | — | — |
| Nonionic ② | — | — | 0.2 g | — |

TABLE A-continued

| | Dye Bath | | | |
|---|---|---|---|---|
| Component | Comparative Example A | Comparative Example B | Comparative Example C | Example I |
| Anionic③ | — | — | — | 0.2 g |

1A nonionic butyl glucoside surfactant obtained commercially under the trade name "Triton BG-5" from Rohm & Haas.
2A nonionic polyglycerol type surfactant obtained commercially under the trade name "Surfactant 10-G" from Olin Corporation, prepared by condensing propylene oxide - ethylene oxide on a polyhydric initiator such as glycerine.
3An anionic alkyl aryl sulfonate type surfactant obtained commercially under the trade name "Dowfax 2Al" from Dow Chemical Company, believed to be sodium salt of dodecylated oxydibenzene sulfonate having the formula:

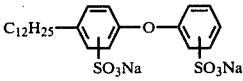

COMPARATIVE EXAMPLE D

Examples II-IV

Reduced indigo dye bath solutions were prepared in the same manner outlined in Comparative Examples A-C and in Example I, using the component proportions set forth in Table B below. Comparative Example D is a control using no surfactant additive. Examples II-IV illustrate the process and composition of the present invention, employing varying amounts of dodecylated oxydibenzene sulfonate anionic surfactant in the reduced indigo dye bath solutions. While the control, Comparative Example D, showed significant crust formation, all of the reduced indigo dye bath solutions containing dodecylated oxydibenzene sulfonate, an anionic surfactant, were totally free of surface crust formations or separations.

TABLE B

| | Dye Bath | | | |
|---|---|---|---|---|
| Component | Comparative Example D | (0.025% by weight Surfactant) Example II | (0.05% by weight Surfactant) Example III | (0.10% by weight Surfactant) Example IV |
| 1% Anionic Surfactant① | 0 | 2.5 cc | 5 cc | 10 cc |
| Distilled Water | 25 cc | 22.5 cc | 20 cc | 15 cc |
| Na$_2$SO$_3$ | 4.2 g | 4.2 g | 4.2 g | 4.2 g |
| Na$_2$S$_2$O$_3$ | 0.52 g | 0.52 g | 0.52 g | 0.52 g |
| 50% KOH | 17.6 cc | 17.6 cc | 17.6 cc | 17.6 cc |
| 80% Na$_2$S$_2$O$_4$ | 10 g | 10 g | 10 g | 10 g |
| Indigo Dye Dispersion | 40 g | 40 g | 40 g | 40 g |
| Total Volume | 100 cc | 100 cc | 100 cc | 100 cc |

1Disodium 4 - sodium salt of dodecylated oxydibenzene sulfonate surfactant obtained commercially under the trade name Dowfax 2A1 from Dow Chemical Company

What is claimed is:

1. In an aqueous sodium hydrosulfite composition for reducing vat or sulfur dye in an aqueous dye bath solution, comprising greater than about 10 percent by weight sodium dithionite, at least 1 percent sodium sulfite by weight of sodium dithionite, and stabilized by alkali metal hydroxide, the improvement characterized by including in said composition an effective surface crust inhibiting amount of an anionic surfactant selected from the group consisting of alkyl sulfates, alkyl aryl phosphate esters, N-acyl-N-alkyl taurates, α-olefin sulfonates, alkyl aryl disulfonates, dodecylated oxydibenzene sulfonates, and mixtures thereof, said effective surface crust inhibiting amount being in the range from about 0.002 to about 4.0 percent by weight of said sodium hydrosulfite composition.

2. The composition of claim 1 wherein said alkali metal hydroxide is an aqueous solution of sodium hydroxide.

3. The composition of claim 1 wherein said alkali metal hydroxide is an aqueous solution of potassium hydroxide.

4. The composition of claim 3 wherein the concentration of said aqueous solution of potassium hydroxide is in the range from about 1 to about 12 grams potassium hydroxide per liter.

5. The composition of claim 4 wherein said alkyl sulfate is sodium lauryl sulfate.

6. The composition of claim 4 wherein said anionic surfactant is an alkyl aryl disulfonate.

7. The composition of claim 5 wherein the concentration of said effective amount of anionic surfactant is in the range from about 0.002 to about 4.0 percent by weight of sodium hydrosulfite composition.

8. The composition of claim 7 wherein the concentration of said effective amount of anionic surfactant is in the range from about 0.01 to about 0.2 percent by weight of sodium hydrosulfite composition.

9. The composition of claim 8 wherein the concentration of said effective amount of anionic surfactant is in the range from about 0.025 to about 0.10 percent by weight of sodium hydrosulfite composition.

10. In a process for reducing vat or sulfur dyes in an aqueous dye bath solution with a sodium hydrosulfite composition, the improvement characterized by employing as the sodium hydrosulfite composition the composition of claim 1.

11. In a process for reducing indigo dye in an aqueous dye bath solution with a sodium hydrosulfite composition, the improvement characterized by employing as the sodium hydrosulfite composition the composition of claim 7.

12. In a process for reducing vat or sulfur dyes in an aqueous dye bath solution with a sodium hydrosulfite composition, the improvement characterized by employing as the sodium hydrosulfite composition the composition of claim 8.

13. The composition of claim 1 wherein said sodium hydrosulfite composition comprises greater than about 13 percent of sodium dithionite.

14. The composition of claim 4 wherein said dodecylated oxydibenze sulfonate is the sodium salt of dodecylated oxydibenzene sulfonate.

* * * * *

UNITED STATES PATENT AND TRADEMARK OFFICE
CERTIFICATE OF CORRECTION

PATENT NO. : 4,285,695

DATED : August 25, 1981

INVENTOR(S) : Richard L. Doerr and Michael Scardera

It is certified that error appears in the above—identified patent and that said Letters Patent is hereby corrected as shown below:

Column 1, lines 34 and 35, "exemplifiled" should read --exemplified--.

Column 3, line 49, "n-Hexsdecyl" should read --n-Hexadecyl--.

Column 4, line 11, "acyl group groups" should read --acyl groups--.

Column 4, line 24, that portion of the formula reading "nf" should read --$n_f$--.

Column 4, lines 31 and 35, those portions of the formula reading "nf" should read --$n_f$--.

Column 7, line 6, in TABLE A-continued, the heading "Component" should read --Surfactant Type--.

Column 8, line 64, claim 14, "oxydibenze" should read --oxydibenzene--.

Signed and Sealed this

Fifteenth Day of June 1982

[SEAL]

Attest:

Attesting Officer

GERALD J. MOSSINGHOFF

Commissioner of Patents and Trademarks